United States Patent
Ito et al.

(10) Patent No.: US 8,047,165 B2
(45) Date of Patent: Nov. 1, 2011

(54) MEDIUM CIRCULATING APPARATUS FOR IMPROVING STARTABILITY AND WARM UP ABILITY

(75) Inventors: Yasushi Ito, Susono (JP); Makoto Suzuki, Mishima (JP); Kenichi Yamada, Yaizu (JP); Rentaro Kuroki, Susono (JP); Tomohiro Shinagawa, Sunto-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 991 days.

(21) Appl. No.: 11/922,141

(22) PCT Filed: Jun. 5, 2006

(86) PCT No.: PCT/JP2006/011664
§ 371 (c)(1),
(2), (4) Date: Dec. 13, 2007

(87) PCT Pub. No.: WO2007/010685
PCT Pub. Date: Jan. 25, 2007

(65) Prior Publication Data
US 2010/0043731 A1    Feb. 25, 2010

(30) Foreign Application Priority Data

Jul. 21, 2005  (JP) .................................. 2005-211791

(51) Int. Cl.
*F01P 9/00* (2006.01)

(52) U.S. Cl. ........... 123/41.01; 123/1 A; 123/3; 123/590

(58) Field of Classification Search ............... 123/41.01, 123/3, 1 A, DIG. 12, DIG. 13, 590
See application file for complete search history.

(56) References Cited

U.S. PATENT DOCUMENTS

| 4,815,431 A | 3/1989 | Yorita et al. |
| 7,775,196 B2 * | 8/2010 | Suzuki et al. ................. 123/538 |
| 7,789,047 B2 * | 9/2010 | Kuroki et al. ..................... 123/3 |
| 2008/0223344 A1 * | 9/2008 | Suzuki et al. ................. 123/525 |

FOREIGN PATENT DOCUMENTS

| EP | 0 816 652 A1 | 1/1998 |
| GB | 363 852 A | 12/1931 |
| JP | 58-033729 U | 3/1983 |
| JP | 58-038318 A | 3/1983 |

(Continued)

OTHER PUBLICATIONS

Office Action issued Mar. 1, 2011 in JP 2005-211791 and English translation thereof.

*Primary Examiner* — Michael Cuff
*Assistant Examiner* — Long T Tran
(74) *Attorney, Agent, or Firm* — Kenyon & Kenyon LLP

(57) ABSTRACT

A medium circulating apparatus of engine oil, which improves startability and warm up ability of an internal combustion engine, includes a microbubble generator that generates microbubbles and mixes the microbubbles into the circulating engine oil. Further, the medium circulating apparatus includes a medium temperature acquiring unit that acquires a temperature of the engine oil. The microbubbles are generated by the microbubble generator when the temperature of the engine oil is less than or equal to a predetermined value in order to decrease a viscosity, a heat conductivity, and a heat capacity of the engine oil in which the microbubbles are mixed.

8 Claims, 8 Drawing Sheets

FOREIGN PATENT DOCUMENTS

| | | |
|---|---|---|
| JP | 58-070510 A | 4/1983 |
| JP | 62-078423 A | 4/1987 |
| JP | 63-78122 U | 5/1988 |
| JP | 63-46653 Y | 12/1988 |
| JP | 05-061406 U | 8/1993 |
| JP | 08-230763 A | 9/1996 |
| JP | 2002-195016 A | 7/2002 |
| JP | 2002-303112 A | 10/2002 |
| JP | 2004-285952 A | 10/2004 |
| JP | 2005-500067 N | 1/2005 |
| JP | 2005-093873 A | 4/2005 |
| JP | 2005-147475 A | 6/2005 |

* cited by examiner

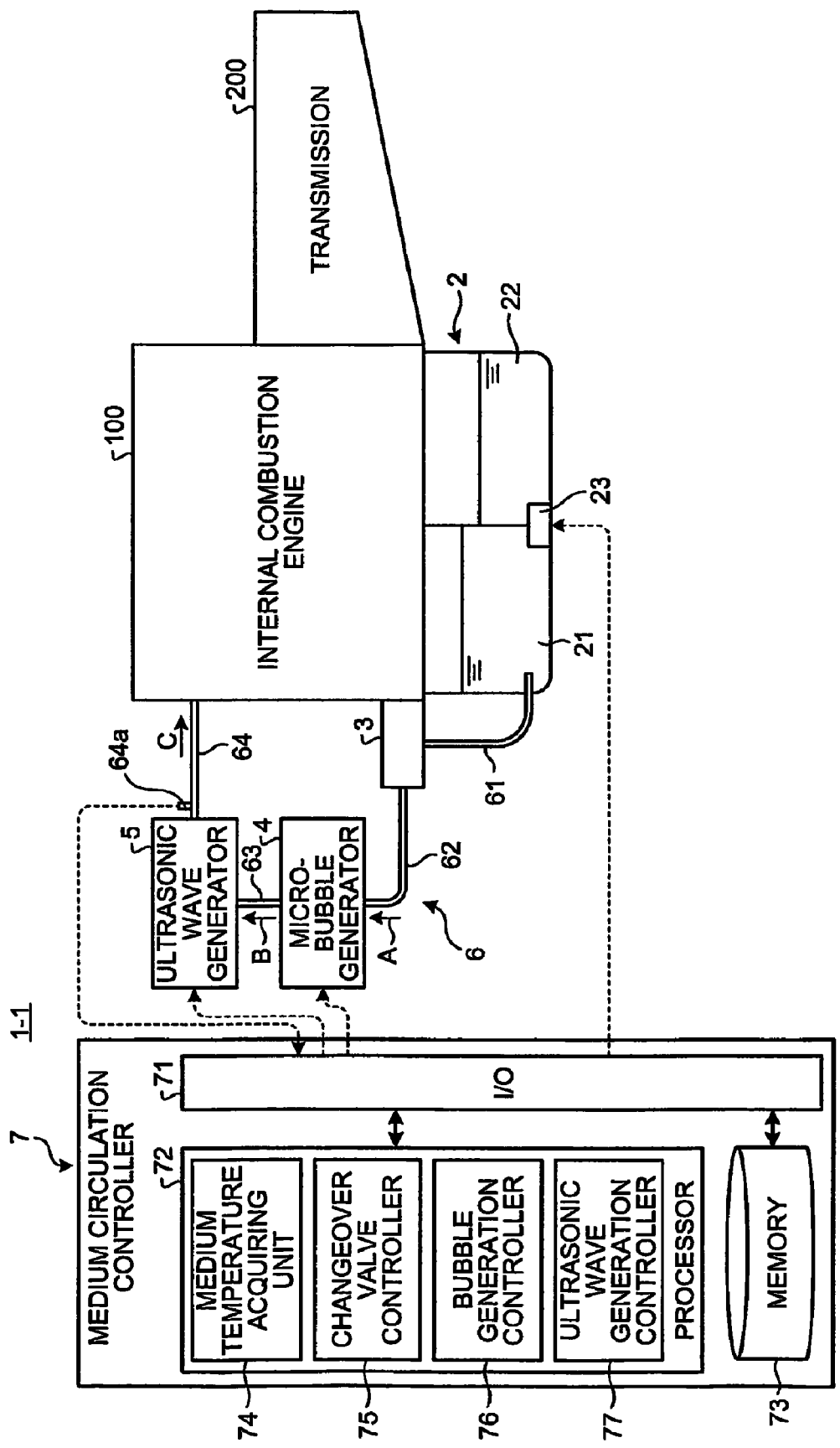

MEDIUM CIRCULATING APPARATUS FOR IMPROVING STARTABILITY AND WARM UP ABILITY

This is a 371 national phase application of PCT/JP2006/311664 filed 5 Jun. 2006, which claims priority to Japanese Patent Application No. 2005-211791 filed 21 Jul. 2005, the contents of which are incorporated herein by reference.

FIELD OF THE INVENTION

The present invention relates to a medium circulating apparatus for improving startability and warm up ability, and more particularly to a medium circulating apparatus that circulates a medium through an internal combustion engine or through a transmission.

BACKGROUND OF THE INVENTION

In general, an internal combustion engine and a transmission are installed in a vehicle such as a car, a truck, and a bus, and a medium circulates through the internal combustion engine and the transmission. Internal combustion engine circulating oil (engine oil) used for lubricating a driven part, driving a movable part, and cooling a heated part when the internal combustion engine is driven, represents the medium that circulates through the internal combustion engine. Further, coolant water is a refrigerant or the medium that suppresses rise of a temperature of the internal combustion engine when the internal combustion engine is driven. On the other hand, transmission circulating oil (mission oil) used for lubricating the driven part, driving the movable part, and cooling the heated part when the transmission changes an output of the internal combustion engine depending on a driving state to transmit the output to a road through a wheel, is a medium that circulates through the transmission.

In general, friction at a low temperature state of the internal combustion engine is preferably reduced when the internal combustion engine is started in order to improve startability. Further, the temperature of the internal combustion engine is preferably raised in a short time from the low temperature state while warming up the internal combustion engine in order to improve warm up ability. Here, the medium circulates through the internal combustion engine and through the transmission at the low temperature state even at the starting and the warming up of the internal combustion engine. Therefore, startability and warm up ability of the internal combustion engine cannot be improved since the medium at the low temperature state circulates therethrough.

In the engine oil and in the mission oil for example, the friction cannot be reduced compared to the friction thereof at a high temperature even if the driven part of the internal combustion engine or the transmission that is connected to the internal combustion engine is lubricated since viscosities of the engine oil and the mission oil increase as the temperatures thereof decrease. Further, a rate at which the temperature of the internal combustion engine rises slows down as the temperature of the coolant water decreases since the coolant water receives heat generated by the internal combustion engine through which the coolant water circulates.

A technique in which an apparent viscosity of the oil is decreased is proposed. For example, Japanese Utility Model Application Laid-Open (JP-U) No. S63-78122 discloses a cooling device that cools the internal combustion engine by circulating the oil through an oil jacket formed on a cylinder block of the internal combustion engine. In the cooling device, a bubble generator is disposed at a predetermined position of the oil jacket to mix fine bubbles into the oil so that the apparent viscosity of the oil is decreased.

In JP-U No. S63-78122, air is injected from one side of an ultrafine fine mesh net and one side of ultrafine small holes drilled and formed on a surface of the bubble generator, to other side thereof to generate ultrafine bubbles. A diameter of the ultrafine bubble is required to be less than or equal to 1 mm. However, the bubbles generated by the small holes and the net can be visually recognized even if the bubbles are said to be small, because for example, the bubble has the diameter of approximately 0.2 mm. Therefore, the bubbles might become larger bubbles by absorbing and combining with each other. Consequently, a pump that sucks and discharges the oil sucks the large bubbles when the oil is circulated, and discharge ability of the pump might decrease. Thus, friction might increase since enough engine oil is not supplied to a section to be lubricated of the driven part of the internal combustion engine.

SUMMARY OF INVENTION

The present invention is provided in view of the foregoing, and an object of the present invention is to provide a medium circulating apparatus that can improve at least one of startability and warm up ability of an internal combustion engine.

In order to solve the problem and to achieve the object, a medium circulating apparatus for improving startability and warm up ability according to one aspect of the present invention is for circulating a medium through an internal combustion engine or through a transmission, and includes a microbubble generator that generates microbubbles and mixes the microbubbles into the medium, and a medium temperature acquiring unit that acquires a temperature of the medium. The microbubble generator generates the microbubbles when the acquired temperature of the medium is less than or equal to a predetermined value.

In the medium circulating apparatus, the medium may preferably be at least one of internal combustion engine circulating oil that circulates through a circulating oil circulating route passing through the internal combustion engine, coolant water that circulates through a coolant water circulating route passing through the internal combustion engine, a transmission circulating oil that circulates through circulating oil circulating route passing through the transmission.

According to this medium circulating apparatus, the microbubble generator mixes ultrafine bubbles difficult to visually recognize, that are the microbubbles, into the medium such as the internal combustion engine circulating oil, the coolant water, and the transmission circulating oil, that circulates through the internal combustion engine. When the microbubbles are mixed into the medium, disturbance at a boundary layer between the medium and the section to be lubricated of the driven part is suppressed by the microbubbles mixed into the medium. Further, a contact area between a liquid section of the medium excluding the microbubbles and a section that contacts with the medium inside the internal combustion engine or inside the transmission such as the section to be lubricated of the driven part is reduced. Furthermore, the gas in the microbubbles has low heat capacity compared to heat capacity of the medium. Therefore, the medium in which the microbubbles are mixed can decrease the viscosity, the heat conductivity, and the heat capacity, compared to a medium in which the microbubbles are not mixed. Consequently, the friction caused when the driven part of the internal combustion engine is lubricated by the medium can be reduced even if the temperature of the medium is low since the viscosity of the medium can be decreased. Further, the medium can hardly receive the heat generated by the internal combustion engine or the transmission through which the medium is circulated even if the temperature of the medium is low since the heat conductivity and the heat capacity can be decreased. Consequently, the temperature of the internal combustion engine can be raised easily.

Further, the enlarging of the microbubbles can be suppressed since the microbubbles mixed into the medium are hardly absorbed and combined with each other even if the microbubbles float within the medium for a long time. Consequently, the decrease in the discharging ability of the pump is suppressed even if the pump that sucks, pressurizes, and discharges the medium to circulate the medium through the internal combustion engine or through the transmission is used. Here, the microbubbles are mixed into the medium.

The medium circulating apparatus according to the present invention may include a circulating oil storage that includes a plurality of tanks storing the internal combustion engine circulating oil, and performs communicative connection between the tanks depending on a temperature of the engine oil. The circulating oil storage does not perform the communicative connection between the tanks when the acquired temperature of the engine oil is less than or equal to a predetermined value.

According to this medium circulating apparatus, each of the tanks are not communicatively connected to each other when the acquired temperature of the engine oil is less than or equal to the predetermined value. Thus, the engine oil stored in certain tanks circulates through the internal combustion engine. That is to say, an amount of the engine oil circulating through the internal combustion engine can be decreased when the temperature of the engine oil is low. Therefore, the mixed quantity of the microbubbles mixed into the engine oil can be increased in a short time since the amount of the engine oil in which the microbubbles generated by the microbubble generator is mixed can be decreased. Consequently, startability and warm up ability of the internal combustion engine can be improved since the viscosity, the heat conductivity, and the heat capacity of the engine oil can be decreased in a short time.

In the medium circulating apparatus according to the present invention, the coolant water circulating route may include a starting circulating route that is provided with the microbubble generator at a middle thereof, and guides the coolant water into the internal combustion engine, and a driving circulating route that includes a coolant unit cooling the coolant water and is communicatively connected to the starting circulating route depending on a temperature of the coolant water. The coolant water circulating route does not perform the communicative connection between the starting circulating route and the driving circulating route when the acquired temperature of the medium is less than or equal to a predetermined value.

According to this medium circulating apparatus, the starting circulating route and the driving circulating route are not communicatively connected to each other when the acquired temperature of the coolant water is less than or equal to the predetermined value. Hence, only the coolant water flowing through the starting circulating route circulates through the internal combustion engine. That is to say, an amount of the coolant water circulating through the internal combustion engine can be decreased when the temperature of the coolant water is low. Therefore, the mixed quantity of the microbubbles mixed into the coolant water can be increased in a short time since the amount of the coolant water in which the microbubbles generated by the microbubble generator are mixed can be decreased. Consequently, warm up ability of the internal combustion engine can be improved since the heat conductivity and the heat capacity of the coolant water can be decreased in a short time.

The medium circulating apparatus according to the present invention may include an ultrasonic wave generator that generates an ultrasonic wave depending on the gas in the microbubbles generated by the microbubble generator, irradiates the medium in which the microbubbles are mixed with the ultrasonic wave. The ultrasonic wave is generated by the ultrasonic wave generator when the acquired temperature of the medium is less than or equal to a predetermined value.

According to the present invention, the microbubbles mixed into the medium by the microbubble generator can distribute uniformly with respect to the medium. The ultrasonic wave generator irradiates the medium in which the microbubbles are uniformly distributed with the ultrasonic wave depending on the gas in the microbubbles. That is to say, the ultrasonic wave has a frequency that can contract and break the microbubbles mixed into the medium. Therefore, the microbubbles that are uniformly distributed with respect to the medium are contracted and broken by the irradiation with the ultrasonic wave, and the temperature of the gas in the microbubbles is raised instantaneously. Consequently, the viscosity of the medium can be further decreased since the temperature of the medium circulating through the internal combustion engine or through the transmission is raised uniformly and instantaneously so that the friction caused when the driven part of the internal combustion engine is lubricated can be further reduced. Further, the medium can hardly receive the heat generated by the internal combustion engine or the transmission through which the medium is circulated since the temperature of the medium circulating through the internal combustion engine or through the transmission can be raised uniformly and instantaneously, so that the temperature of the internal combustion engine can be raised even more easily.

The medium circulating apparatus according to the present invention can reduce viscosity, heat conductivity, and heat capacity of a medium by mixing microbubbles into the medium that circulates through an internal combustion engine or through a transmission; therefore, startability and warm up ability of the internal combustion engine can be improved.

BRIEF DESCRIPTION OF DRAWINGS

FIG. 1 is a schematic drawing of a medium circulating apparatus according to a first embodiment;

DETAILED DESCRIPTION

Embodiments of a medium circulating apparatus for improving startability and warm up ability according to the present invention are explained below with reference to accompanying drawings; however, the present invention in its broader aspects is not limited to the specific details and representative embodiments shown and described herein. Accordingly, elements in the following embodiments include elements that can be easily assumed by those skilled in the art or the equivalents thereof. The medium circulating apparatus explained below is a device that circulates a medium through an internal combustion engine such as a gasoline engine, a diesel engine, and an LPG engine (Liquefied Petroleum Gas), or through a transmission that transmits an output of the internal combustion engine to a wheel. Here, the internal combustion engine and the transmission are installed in a vehicle such as a car and a truck.

Figure 2A:
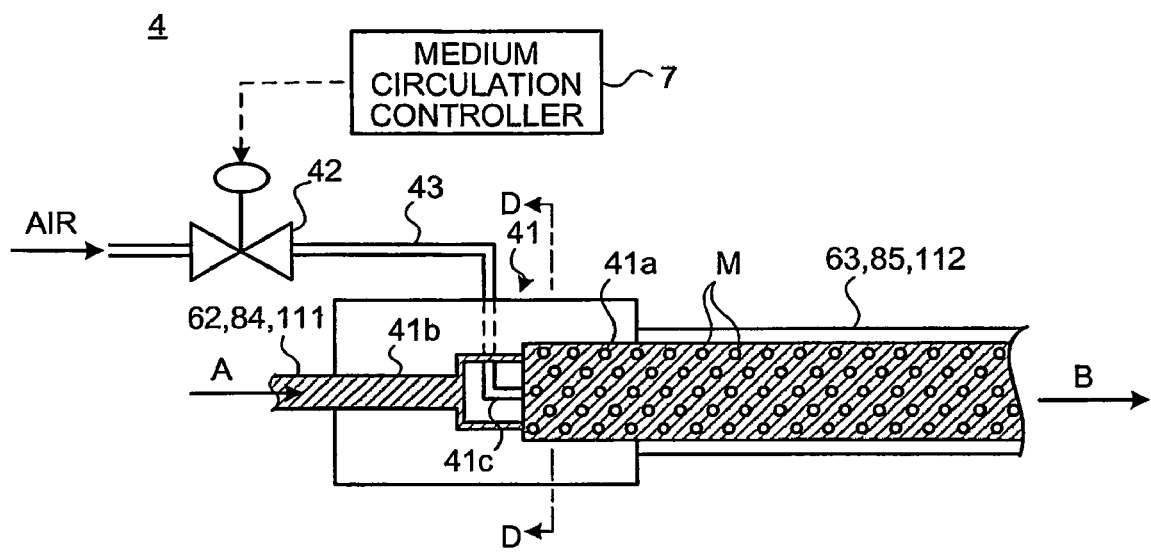
FIG. 2A is a schematic drawing of a microbubble generator.
Figure 2B:
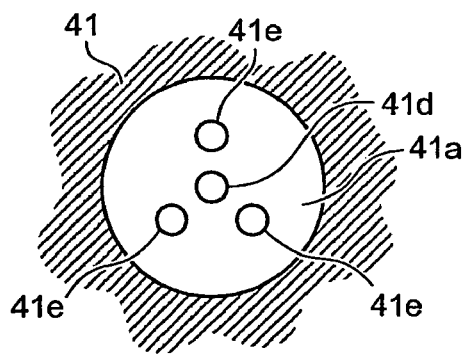
FIG. 2B is an enlarged view of a relevant part of the microbubble generator (D-D sectional view of FIG. 2A)
Figure 3A:
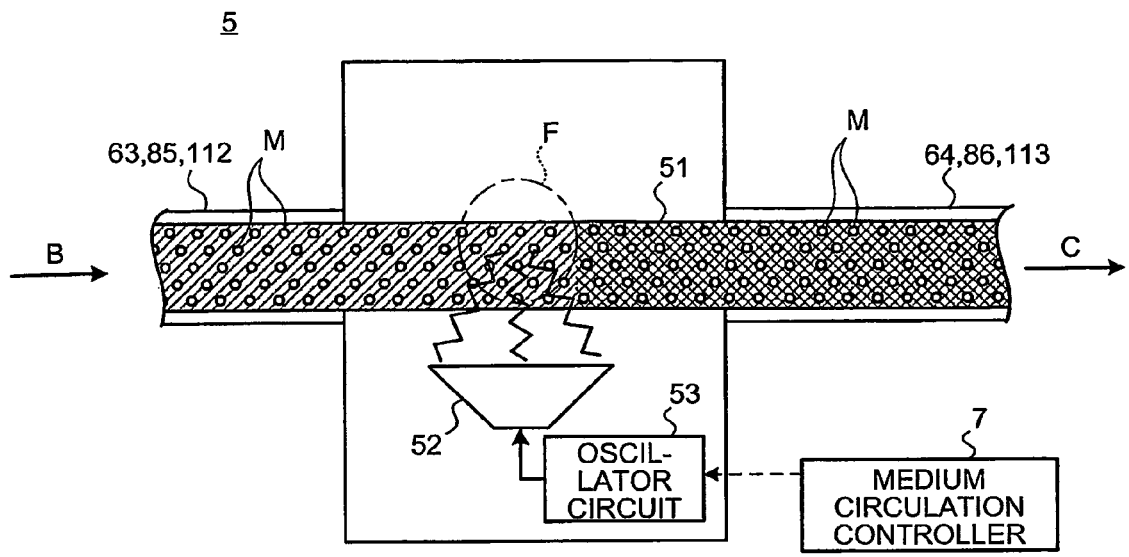
FIG. 3A is a schematic drawing of an ultrasonic wave generator.
Figure 3B:
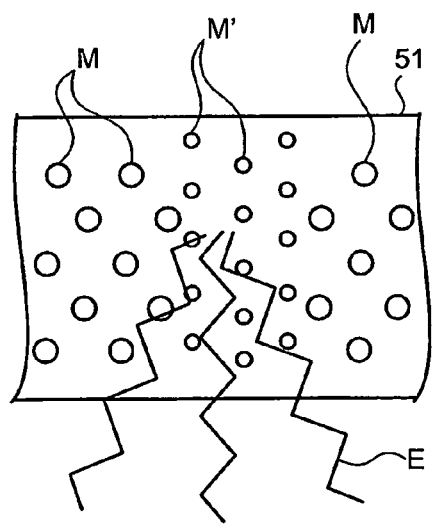
FIG. 3B is a schematic drawing of a state of microbubbles (F section enlarged view of FIG. 3A)

FIG. 1 is a schematic drawing of the medium circulating apparatus according to a first embodiment. FIG. 2A is a schematic drawing of a microbubble generator. FIG. 2B is an enlarged view of a relevant part of the microbubble generator. FIG. 3A is a schematic drawing of an ultrasonic wave generator. FIG. 3B is a schematic drawing of a state of microbubbles. A medium circulating apparatus 1-1 according to the first embodiment uses internal combustion engine circulating oil (hereinafter simply referred to as engine oil) as the medium for the internal combustion engine that lubricate a driven part, drives a movable part, and cools a heated part, when an internal combustion engine 100 is driven. The medium circulating apparatus 1-1 according to the first embodiment circulates the engine oil through an engine oil circulating route 6 that is a circulating oil circulating route passing through the internal combustion engine 100. The medium circulating apparatus 1-1 is configured by an oil pan 2, an engine oil pump 3, a microbubble generator 4, an ultrasonic wave generator 5, an engine oil circulating route 6, and a medium circulation controller 7. The engine oil circulating route 6 includes a space, a path formed inside the internal combustion engine 100, and the like. Here, the engine oil flows through the path. That is to say, the engine oil circulating route 6 includes the path and the space such as a path that supplies the engine oil to a section to be lubricated of the driven part, to a section to be driven of the movable part, and to a section to be cooled of the heated part of the internal combustion engine 100, another path that is used to carry the supplied engine oil back to the oil pan 2, and a space (for example, a crankcase represents the space).

The oil pan 2 is arranged in a middle of the engine oil circulating route 6 as shown in FIG. 1, and the oil pan 2 is a circulating oil storage that stores the engine oil circulating through the internal combustion engine 100. The oil pan 2 is configured by a plurality of tanks and a unit that controls communicative connection within the tanks. In the first embodiment, the oil pan 2 is configured by two tanks 21, 22, and a switchover valve 23 that controls the communicative connection between the tanks 21 and 22. Each of the tanks 21 and 22 is attached at a bottom of the internal combustion engine 100, and the engine oil circulated through the internal combustion engine 100 returns to the tanks to be stored therein. The oil pan 2 is connected to at least one tank of the plurality of the tanks, and the tank 21 is connected to the engine oil circulating route 6 in the first embodiment. Therefore, the engine oil stored inside the tank 21 again circulates through the internal combustion engine 100 by the engine oil circulating route 6.

Further, the changeover valve 23 opens and closes based on a changeover valve opening and closing signal outputted from the medium circulation controller 7. Therefore, the engine oil stored in the tank 22 circulates through the internal combustion engine 100 by the engine oil circulating route 6 since the engine oil stored in the tank 22 is flowed into the tank 21 by opening the change over valve 23 to communicatively connect the tanks 21 and 22. On the other hand, each of the tanks 21 and 22 are not communicatively connected when the changeover valve 23 is closed. Hence, the engine oil stored in the tank 22 does not flow into the tank 21 so that only the engine oil stored in the tank 21 circulates through the internal combustion engine 100 by the engine oil circulating route 6. That is to say, an amount of the engine oil that circulates through the internal combustion engine 100 can be controlled by controlling the changeover valve 23 to communicatively connect the tanks 21 and 22.

The engine oil pump 3 is arranged at a middle of the engine oil circulating route 6 as shown in FIG. 1, and the engine oil pump 3 pressurizes the engine oil stored in the oil pan 2 and supplies to the engine oil circulating route 6. The engine oil pump 3 is connected to the tank 21 of the oil pan 2 through an oil circulating path 61, and the engine oil pump 3 is connected to the microbubble generator 4 through an oil circulating path 62. Therefore, the engine oil stored in the oil pan 2 is sucked by the engine oil pump 3 through the oil circulating path 61, and the engine oil is pressurized by the engine oil pump 3. The pressurized engine oil is discharged into the oil circulating path 62, and the pressurized engine oil is flowed into the microbubble generator 4 as shown by an arrow A of FIGS. 1 and 2. The engine oil pump 3 is activated by an output generated by driving the internal combustion engine 100. For example, the engine oil pump 3 is activated by torque generated at a crank shaft not shown of the internal combustion engine 100.

Microbubbles M are generated from air, which is gas, by the microbubble generator 4 as shown in FIGS. 1 to 2A. The microbubble generator 4 is arranged at a middle of the engine oil circulating route 6, and the microbubble generator 4 mixes the generated microbubbles M into the medium flowing through the microbubble generator 4. Here, the medium is the engine oil, in the first embodiment. The microbubble generator 4 is configured by a bubble generator main body 41, a gas introduction control valve 42, and a gas introduction path 43. The microbubble generator 4 is connected to the ultrasonic wave generator 5 through an oil circulating path 63. Therefore, the engine oil in which the generated microbubbles M are mixed is flowed into the ultrasonic wave generator 5 as shown by an arrow B in FIGS. 1, 2A, and 3A. Here, the microbubbles M are ultrafine bubbles difficult to visually recognize, and a diameter thereof is 50 μm and preferably has the diameter lying in a range between 20 μm and 30 μm. The microbubbles M are difficult to be absorbed by each other and difficult to be combined with each other, and the microbubbles M can float within the medium for a long time.

The bubble generator main body 41 generates the microbubbles M, and the bubble generator main body 41 mixes the generated microbubbles M into the engine oil flowing out from the oil circulating path 62. Then, the engine oil flows into the oil circulating path 63. A bubble generator 41a is formed in the bubble generator main body 41. The microbubble generator 4 generates the microbubbles M from gas supplied to the bubble generator 41a by shear force caused by the injection of the engine oil into the bubble generator 41a.

A medium introduction path 41b and a gas introduction path 41c that are both communicatively connected to the bubble generator 41a are formed in the bubble generator main body 41. One end of the bubble generator 41a at a downstream side with respect to a flow direction of the engine oil is opened and is communicatively connected to the oil circulating path 63. Further, a gas opening 41d that communicatively connects to one end of the gas introduction path 41c is formed at the center of the cross-sectioned bubble generator 41a and at an end of an upstream side with respect to the flow direction of the engine oil. A plurality of medium openings 41e that communicatively connect to one end of the medium introduction path 41b (this refer to branched plurality of ends in the present embodiment) are formed around the gas opening 41d at the end of the upstream side. Other end of the medium introduction path 41b (an end at the upstream side with respect to the flow direction of the engine oil) is connected to the oil circulating path 62. Further, other end of the gas introduction path 41c is connected to one end of the gas introduction path 43.

The gas introduction control valve 42 is provided at a middle of the gas introduction path 43. The gas introduction control valve 42 opens and closes based on a control valve opening and closing signal outputted from the medium circulation controller 7.

In the first embodiment, one end of the gas introduction path 43 is connected to a gas tank (not shown) that stores high pressure gas therein. A pressure of the engine oil decreases as injecting the engine oil into the bubble generator 41a of the bubble generator main body 41; therefore, the gas is supplied to the bubble generator 41a through the gas introduction path 43 due to the pressure difference between the gas and the engine oil.

The ultrasonic wave generator 5 generates an ultrasonic wave E as shown in FIGS. 1 and 3A, and the ultrasonic wave generator 5 is arranged at a middle of the engine oil circulating route 6. The ultrasonic wave generator 5 irradiates the medium in which the microbubbles M are mixed with the ultrasonic wave E, and the ultrasonic wave generator 5 irradiates the engine oil in which the microbubbles M are mixed with the ultrasonic wave E in the first embodiment. The ultrasonic wave generator 5 is configured by an ultrasonic wave irradiate path 51, an oscillator 52, and an oscillator circuit 53. The ultrasonic wave generator 5 is connected to a path not shown formed inside the internal combustion engine 100 used for supplying the engine oil, through an oil circulating path 64. Therefore, the engine oil in which the microbubbles M irradiated with the ultrasonic wave E are mixed is supplied into the internal combustion engine 100 as shown by an arrow C of FIGS. 1 and 3A, and the engine oil is supplied to the section to be lubricated of the driven part, to the section to be driven of the movable part, and to the section to be cooled of the heated part, inside the internal combustion engine 100. Consequently, the driven part of the internal combustion engine 100 is lubricated, the movable part of the internal combustion engine 100 is driven, and the heated part of the internal combustion engine is cooled. The engine oil used to lubricate the driven part, to drive the movable part, and to cool the heated part, is returned to the oil pan 2.

Here, the ultrasonic wave E has a frequency capable of contracting and breaking the gas in the microbubbles M, which are generated by the microbubble generator 4 and mixed into the medium. The ultrasonic wave E according to the first embodiment has a frequency capable of contracting and breaking the air that configures the microbubbles M mixed into the engine oil.

One end (an end at the upstream side with respect to the flow direction of the engine oil) of the ultrasonic wave irradiate path 51 is connected to the oil circulating path 63, and other end thereof (an end at the downstream side with respect to the flow direction of the engine oil) is connected to the oil circulating path 64. The oscillator 52 is provided so that a focal point of the oscillator 52 (a focal point of the ultrasonic wave generated by the oscillator 52) is set within the ultrasonic wave irradiate path 51. The oscillator 52 is connected to the oscillator circuit 53, and the oscillator 52 is activated by an oscillator activate signal outputted to the oscillator circuit 53 from the medium circulation controller 7.

Here, 64a represents an engine oil temperature sensor, which is a medium temperature detector that detects the temperature of the engine oil supplied into the internal combustion engine 100, for outputting the temperature to the medium circulation controller 7.

The medium circulation controller 7 mainly is a bubble generation controller that controls the generation of the microbubbles M as well as is an ultrasonic wave generation controller that controls the generation of the ultrasonic wave. A medium temperature detected by the medium temperature detector is inputted to the medium circulation controller 7 to control the microbubble generator 4 and the ultrasonic wave generator 5 based on the medium temperature. In the first embodiment, the medium temperature described above refers to the engine oil temperature detected by the engine oil temperature sensor 64a.

Specifically, the medium circulation controller 7 is configured by an input and output part (I/O) 71 that inputs and outputs the input signal and the output signal, a processor 72 that at least has functions of controlling the generation of the microbubbles M by the microbubble generator 4 and the generation of the ultrasonic wave E by the ultrasonic wave generator 5, and a memory 73. The processor 72 includes a medium temperature acquiring unit 74, a changeover valve controller 75, a bubble generation controller 76, and an ultrasonic wave generation controller 77. Further, the processor 72 can be configured by the memory and a CPU (Central Processing Unit), and control of the medium circulating apparatus 1-1 can be realized by loading a program to the memory and executing the program. The program is based on a way of controlling the microbubble generator 4, a way of controlling the ultrasonic wave generator 5, and the like. The memory 73 can be configured by a nonvolatile memory such as a flash memory, a memory that is readable such as a ROM (Read Only Memory), a memory that is readable and writable such as a RAM (Random Access Memory), or a combination of the memories mentioned. The medium circulation controller 7 is not necessarily configured separately. An ECU (Engine Control Unit) that controls the driving of the internal combustion engine 100 may include the function of the medium circulation controller 7.

Figure 4:
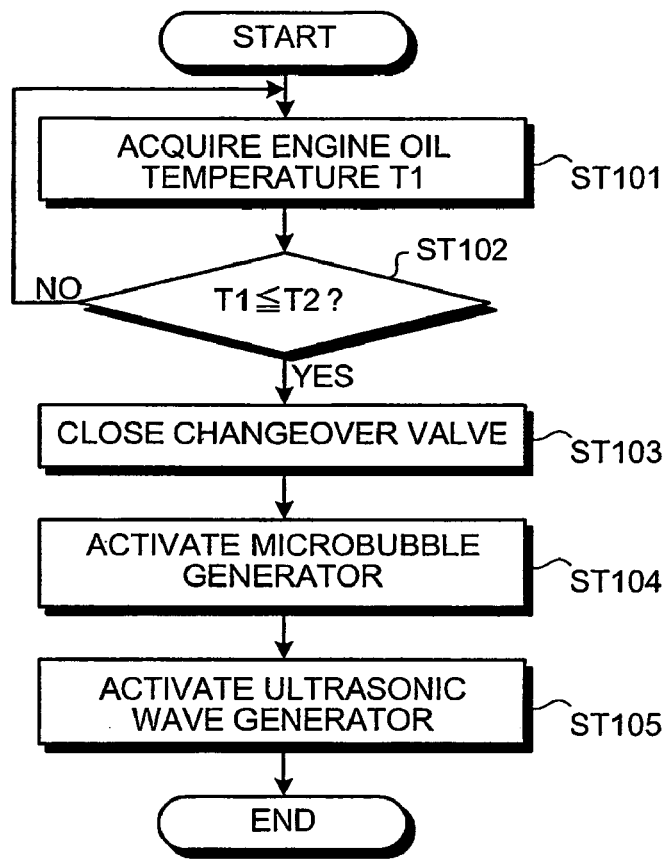
FIG. 4 is a control flow chart of the medium circulating apparatus according to the first embodiment.

An operation of the medium circulating apparatus 1-1 according to the first embodiment is explained next. More particularly, a way of controlling the microbubble generator 4 and the ultrasonic wave generator 5 is explained. FIG. 4 is a control flow chart of the medium circulating apparatus 1-1 according to the first embodiment. Here, the engine oil circulates constantly through the engine oil circulating route 6 from the start until the stop of the internal combustion engine 100 since the engine oil pump 3 is activated when the internal combustion engine 100 is driven.

The medium temperature acquiring unit 74 of the processor 72 of the medium circulation controller 7 acquires a temperature T1 of the engine oil, that is the medium, while the engine oil circulates through the internal combustion engine 100 due to the driving of the internal combustion engine 100 (step ST101). Specifically, the medium temperature acquiring unit 74 acquires the temperature T1 of the engine oil circulating through the internal combustion engine 100. Here, the engine oil temperature T1 is detected by the engine oil temperature sensor 64a, and the temperature T1 is outputted to the medium circulation controller 7.

Next, the changeover valve controller 75 of the processor 72 determines whether the temperature T1 of the engine oil acquired by the medium temperature acquiring unit 74 is less than or equal to a predetermined value T2 or not (step ST102). Here, the predetermined value T2 is a temperature at which viscosity of the engine oil circulating through the internal combustion engine 100 becomes high and starting of the internal combustion engine 100 becomes difficult. For example, the predetermined temperature T2 represents a temperature of the engine oil at a cold start of the internal combustion engine 100. The medium temperature acquiring unit 74 of the processor 72 repeats acquiring the temperature T1 of the engine oil until the acquired temperature T1 of the engine oil becomes less than or equal to the predetermined value T2.

Next, the changeover valve controller 75 of the processor 72 closes the changeover valve 23 when the changeover valve controller 75 determines that the temperature T1 of the engine oil supplied to the internal combustion engine 100 is less than or equal to the predetermined value T2 (step ST103). Specifically, the changeover valve controller 75 outputs a changeover valve opening and closing signal to the changeover valve 23 to close the changeover valve 23. That is to say, the engine oil circulating through the engine oil circulating route 6 becomes only the engine oil that is stored in the tank 21 of the oil pan 2.

Next, the bubble generation controller 76 of the processor 72 activates the microbubble generator 4 when the temperature T1 of the engine oil supplied to the internal combustion engine 100 is less than or equal to the predetermined value T2, while closing the changeover valve 23 (step ST104). Specifically, the bubble generation controller 76 outputs a control valve opening and closing signal to the gas introduction control valve 42 to open the gas introduction control valve 42. Consequently, the air is supplied from the gas opening 41d to the bubble generator 41a through the gas introduction path 43 and through the gas introduction path 41c due to the pressure difference between the air and the engine oil, as described above.

The engine oil pressurized by the engine oil pump 3 is supplied from the medium opening 41e to the bubble generator 41a through the oil circulating path 62 and through the medium introduction path 41b. Therefore, the microbubbles M are generated from the air supplied to the bubble generator 41a by shear force caused by the injection of the pressurized engine oil into the bubble generator 41a, and the microbubbles M are mixed into the engine oil flowing into the oil circulating path 63 from the bubble generator 41a (see FIGS. 2A and 2B). Hence, the microbubble generator 4 generates the microbubbles M, and mixes the generated microbubbles M into the engine oil, that is the medium. The microbubble generator 4 can uniformly mix the generated microbubbles M into the engine oil since the microbubble generator 4 generates the microbubbles M with respect to the engine oil flowing through the bubble generator 41a. That is to say, the microbubbles M can be uniformly distributed within the engine oil.

Figure 5:
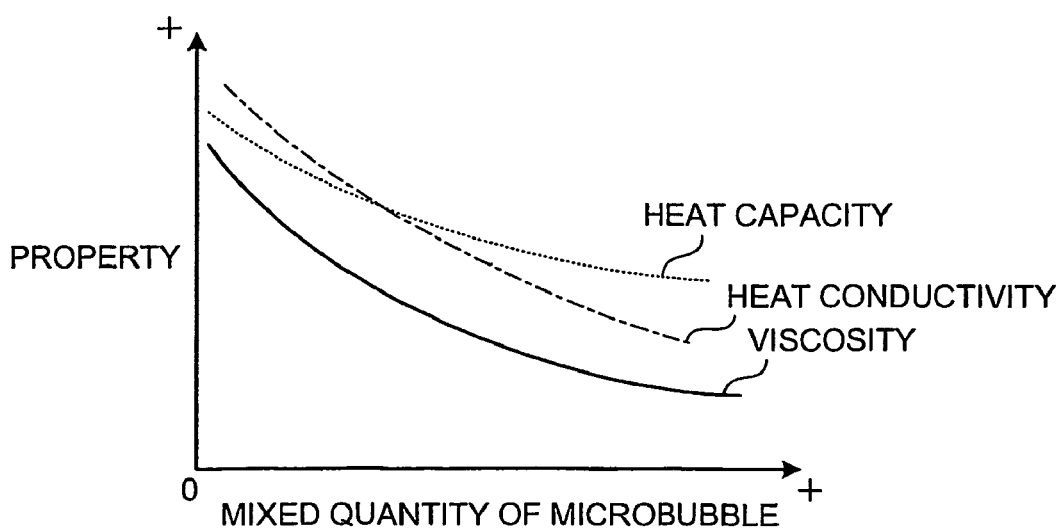
FIG. 5 is a graph showing a relationship between a property of the medium and a mixed quantity of the microbubbles.

FIG. 5 is a graph showing a relationship between a property of the medium and a mixed quantity of the microbubbles. As shown in FIG. 5, when the microbubbles M are mixed into the medium, which is the engine oil in the first embodiment, the viscosity, a heat conductivity, and a heat capacity of the medium are decreased according to the amount of the microbubbles M mixed into the medium. It is considered that the reason for the decrease in the viscosity of the medium is that disturbance at a boundary layer between the section to be lubricated of the driven part and the medium is suppressed by the microbubbles mixed into the medium. Further, it is considered that the viscosity of the medium is decreased since the contact area of the liquid section excluding the microbubbles in the medium and the section to be lubricated of the contacted part is reduced due to density decrease of the medium caused by the microbubbles mixed into the medium. Further, it is considered that the reason for the decrease in the heat conductivity of the medium is that the density of the medium is decreased by the microbubbles mixed into the medium. Consequently, the contact area between the liquid section excluding the microbubbles in the medium and the section that contacts with the medium inside the internal combustion engine 100 or inside the transmission 200 is decreased. Furthermore, the reason for the decrease in the heat capacity of the medium is that the heat capacity of the gas in the microbubbles M mixed into the medium is lower than the heat capacity of the medium. Therefore, the medium in which the microbubbles M are mixed can decrease the viscosity, the heat conductivity, and the heat capacity, compared to the viscosity, the heat conductivity, and the heat capacity of the medium in which the microbubbles M are not mixed.

As described above, the amount of the engine oil circulating through the internal combustion engine 100 can be decreased when the changeover valve 23 is closed, compared to the amount of the engine oil when the changeover valve 23 is opened. Therefore, more engine oil circulating through the internal combustion engine 100 flows through the microbubble generator 4 when the temperature T1 of the engine oil is low so that the amount of the microbubbles mixed into the engine oil is increased in a short time. Consequently, the viscosity, the heat conductivity, and the heat capacity of the engine oil can be decreased in the short time.

Next, the ultrasonic wave generation controller 77 of the processor 72 activates the ultrasonic wave generator 5 while the microbubble generator 4 is activated (step ST105). Specifically, the ultrasonic wave generation controller 77 outputs the oscillator activate signal to the oscillator circuit 53, and the oscillator circuit 53 activates the oscillator 52. Consequently, the oscillator 52 generates the ultrasonic wave E as described above. In the present embodiment, the ultrasonic wave E has the frequency capable of contracting the air which is the gas in the microbubbles M, and breaking the microbubbles M. The ultrasonic wave generator 5 irradiates the pressurized engine oil, in which the microbubbles M are mixed, flowing through the ultrasonic wave irradiate path 51 with the ultrasonic wave E (see FIG. 3A). Hence, the ultrasonic wave generation controller 77 generates the ultrasonic wave E, and the ultrasonic wave generation controller 77 irradiates the engine oil, in which the microbubbles M are mixed, with the ultrasonic wave E.

The microbubbles M mixed into the engine oil and to be irradiated with the ultrasonic wave E contract to become small microbubbles M' and break inside the engine oil as shown in FIG. 3B. The microbubbles M mixed into the engine oil repeat the contraction in a short time when the engine oil is irradiated with the ultrasonic wave E so that the temperatures of the microbubbles M' are raised instantaneously. Further, a part of the microbubbles M that are mixed into the engine oil break due to the irradiation with the ultrasonic wave E; therefore, the energy from the breaking of the microbubbles is converted into heat energy so that the temperature of the engine oil is raised instantaneously. Consequently, the temperature T1 of the engine oil in which the microbubbles M are mixed is raised instantaneously. The temperature T1 of the engine oil can uniformly be raised since the microbubbles M are uniformly distributed in the engine oil, as described above.

The engine oil in which the temperature T1 is raised instantaneously is supplied into the internal combustion engine 100 with the microbubbles M that are mixed into the engine oil. The engine oil supplied into the internal combustion engine 100 is supplied to the section to be lubricated of the driven part, the section to be driven of the movable part, and the section to be cooled of the heated part of the internal combustion engine 100, through the path not shown. The viscosity, the heat conductivity, and the heat capacity of the engine oil supplied thereto are decreased.

Therefore, the friction caused when the driven part of the internal combustion engine 100 is lubricated can be reduced by the engine oil even if the temperature of the internal combustion engine 100 is low and the temperature of the engine oil is low, whereby startability of the internal combustion engine 100 can be improved. Further, the medium can hardly receive the heat generated by the internal combustion engine 100 through which the engine oil is circulated even if the temperature of the internal combustion engine 100 is low and the temperature of the engine oil is low so that the temperature of the internal combustion engine 100 can be easily raised. Therefore, warm up ability of the internal combustion engine 100 can be improved. Startability and warm up ability of the internal combustion engine 100 can be improved as explained above; therefore, fuel consumption can be improved and degradation of emission can be suppressed.

Further, startability of the internal combustion engine can be further improved since the temperature T1 of the engine oil supplied into the internal combustion engine 100 is increased and the viscosity is further decreased. Furthermore, warm up ability of the internal combustion engine 100 can be further improved since the temperature T1 of the engine oil supplied into the internal combustion engine 100 is increased so that the engine oil circulating through the internal combustion engine 100 can hardly receive the heat generated by the internal combustion engine 100.

Each of the tanks 21 and 22 are communicatively connected to each other by the medium circulation controller 7 that controls the opening and closing of the changeover valve 23 in the above first embodiment; however, the present invention is not limited to the above first embodiment. For example, each of the tanks 21 and 22 can be communicatively connected to each other by a thermostat or a valve formed by a shape memory alloy. The thermostat and the valve are set so that the each of the tanks 21 and 22 are communicatively connected to each other when the temperature T1 of the engine oil circulating through the internal combustion engine 100 exceeds the predetermined value T2.

The microbubble generator 4 is provided at the middle of the engine oil circulating route 6 in the first embodiment; however, the present invention is not limited to the above first embodiment. For example, the microbubble generator 4 can mix the generated microbubbles M into the engine oil stored in the oil pan 2. Specifically, the microbubble generator 4 mixes the generated microbubbles M into the engine oil stored in the tank 21 that is connected to the engine oil circulating route 6.

Figure 6:
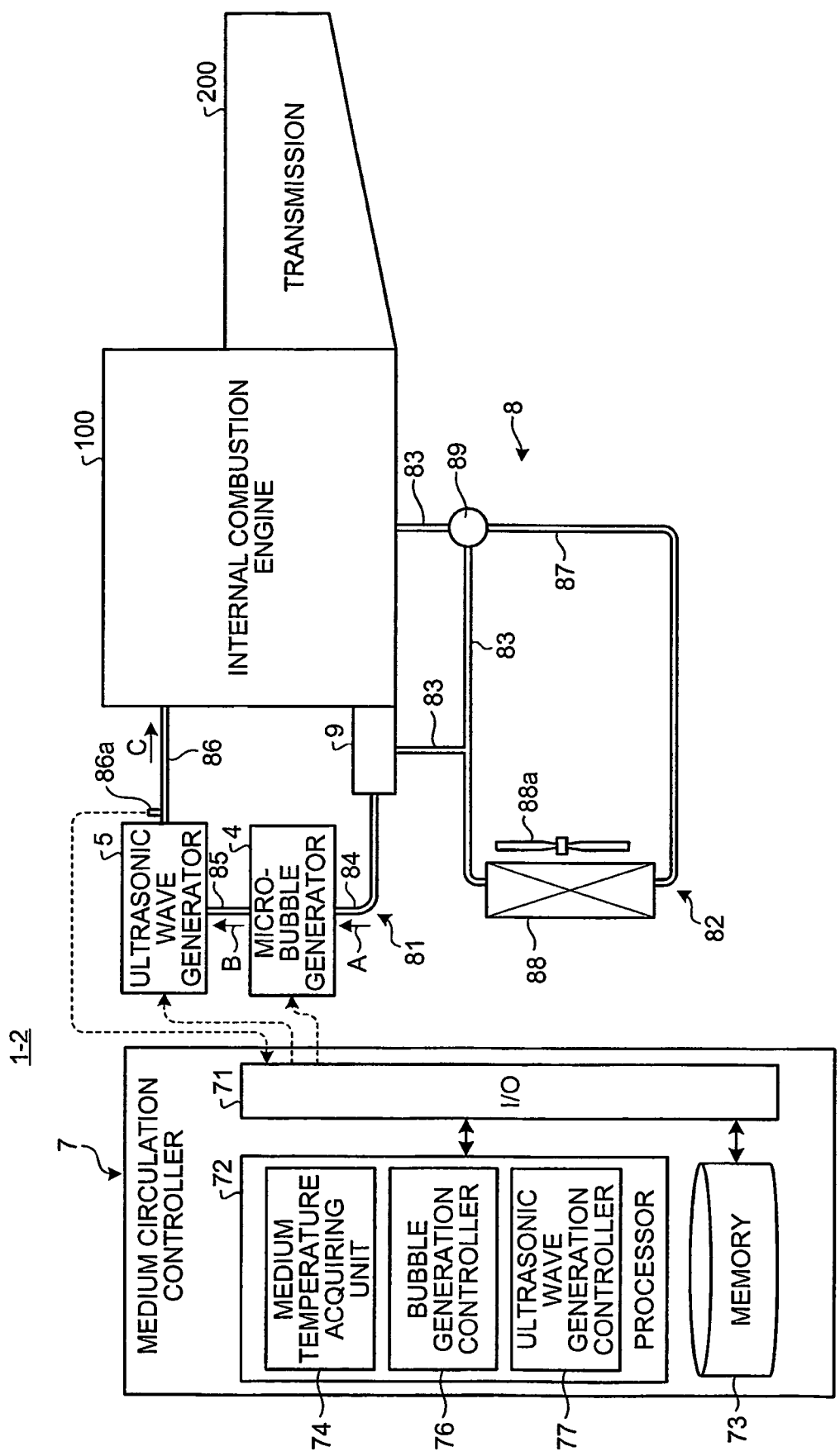
FIG. 6 is a schematic drawing of a medium circulating apparatus according to a second embodiment.

A medium circulating apparatus 1-2 according to a second embodiment is explained below. FIG. 6 is a schematic drawing of the medium circulating apparatus according to the second embodiment. The medium circulating apparatus 1-2 according to the second embodiment uses coolant water, which mainly cools the heated part, as the medium when the internal combustion engine 100 is driven. The medium circulating apparatus 1-2 according to the second embodiment circulates the coolant water by a coolant water circulating route 8 that passes through the internal combustion engine 100. Most of parts of the medium circulating apparatus 1-2 according to the second embodiment are similar to the medium circulating apparatus 1-1 according to the first embodiment; therefore, explanations for the identical parts (numbers in FIG. 6 that are identical to the numbers in FIG. 1) are not repeated.

The medium circulating apparatus 1-2 is configured by a water pump 9, the microbubble generator 4, the ultrasonic wave generator 5, the coolant water circulating route 8, and the medium circulation controller 7. The coolant water circulating route 8 includes a space, a path, and the like, that are formed inside the internal combustion engine 100, through which the coolant water flows. Hence, the coolant water circulating route 8 includes a path, a space (for example, water jacket), and the like used for supplying the coolant water to the cooling section of the heated part of the internal combustion engine 100.

The coolant water circulating route 8 is configured by a starting circulating route 81 and a driving circulating route 82, as shown in FIG. 6. The starting circulating route 81 is configured by a plurality of coolant water circulating paths 83 to 86. The microbubble generator 4, the ultrasonic wave generator 5, and the water pump 9 are arranged at a middle of the starting circulating route 81, and the starting circulating route 81 is a route so that the coolant water flows through the internal combustion engine 100. On the other hand, the driving circulating route 82 is configured by a coolant water circulating path 87 that is branched from the coolant water circulating path 83 connected to the water pump 9 and joins to the coolant water circulating path 83. A radiator 88, which is a cooling unit to cool the coolant water, is arranged at a middle of the driving circulating route 82, and the coolant water flows through the radiator 88.

A thermostat 89 communicatively connects the coolant water circulating path 83 and the coolant water circulating path 87 based on a temperature T3 of the coolant water that flows through the thermostat 89. Therefore, the coolant water inside the coolant water circulating path 87 and inside the radiator 88 flows into the coolant water circulating path 83 when the thermostat 89 is opened so that the coolant water of the driving circulating route 82 circulates through the internal combustion engine 100 by the starting circulating route 81. On the other hand, the coolant water inside the coolant water circulating path 87 and inside the radiator 88 does not flow into the coolant water circulating path 83 when the thermostat 89 is closed so that only the coolant water of the starting circulating route 81 circulates through the internal combustion engine 100. That is to say, the amount of the coolant water circulating through the internal combustion engine 100 can be controlled by controlling the communicative connection of the starting circulating route 81 and the driving circulating route 82 by the thermostat 89. Here, 86a is a coolant water temperature sensor that is the medium temperature detector to detect the temperature of the coolant water supplied into the internal combustion engine 100 and to output the detected temperature to the medium circulation controller 7. Further,

88*a* is a fan that performs forced cooling of the coolant water flowing through the radiator 88.

The water pump 9 is arranged at a middle of the starting circulating route 81 of the coolant water circulating route 8. The water pump 9 pressurizes the coolant water carried back to the coolant water circulating path 83 after flowing through the internal combustion engine, to supply the coolant water again into the internal combustion engine 100 through the microbubble generator 4 and the ultrasonic wave generator 5. The water pump 9 is activated due to an output generated by driving the internal combustion engine 100. For example, the water pump 9 is activated by the torque generated by the crank shaft not shown of the internal combustion engine 100.

Figure 7:
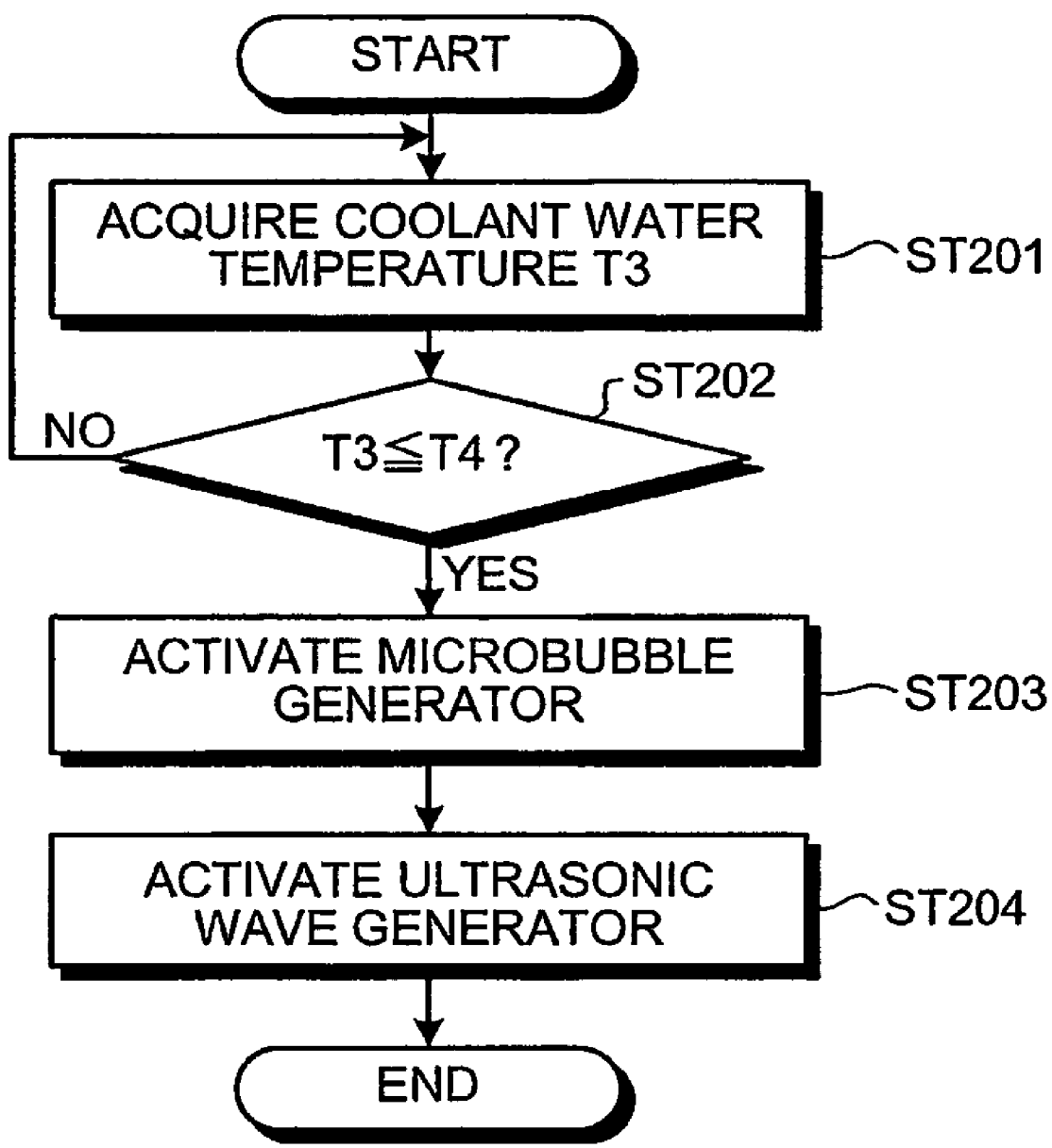
FIG. 7 is a control flow chart of the medium circulating apparatus according to the second embodiment.

Next, an operation of the medium circulating apparatus 1-2 according to the second embodiment is explained. FIG. 7 is a control flow chart of the medium circulating apparatus according to the second embodiment. Explanations of the operation of the medium circulating apparatus 1-2 according to the second embodiment that is identical to the operation of the medium circulating apparatus 1-1 according to the first embodiment are not repeated. In the second embodiment, the coolant water constantly circulates through the coolant water circulating route 8 from the start until the stop of the internal combustion engine 100 since the water pump 9 is activated with the driving of the internal combustion engine 100.

First, the medium temperature acquiring unit 74 of the processor 72 of the medium circulation controller 7 acquires the temperature T3 of the coolant water, that is the medium, when the coolant water circulates through the internal combustion engine 100 due to the driving of the internal combustion engine 100 (step ST201). Specifically, the medium temperature acquiring unit 74 acquires the temperature T3 of the coolant water that circulates through the internal combustion engine 100. Here the temperature T3 is detected by the coolant water temperature sensor 86*a*, and the temperature T3 is outputted to the medium circulation controller 7.

Next, the bubble generation controller 76 of the processor 72 determines whether the acquired temperature T3 of the coolant water is less than or equal to a predetermined value T4 (step ST202). Here, the predetermined value T4 is a temperature at which the temperature of the coolant water circulating through the internal combustion engine 100 is low so that it is easier for the coolant water to receive the heat generated by the internal combustion engine 100. For example, it is a temperature of the coolant water at the cold start of the internal combustion engine 100. The medium temperature acquiring unit 74 of the processor 72 repeats to acquire the temperature T3 of the coolant water until the acquired temperature T3 of the coolant water becomes less than or equal to the predetermined value T4.

Next, the bubble generation controller 76 of the processor 72 activates the microbubble generator 4 when the bubble generation controller 76 determines that the temperature T3 of the coolant water supplied to the internal combustion engine 100 is less than or equal to the predetermined value T4 (step ST203). At this time, the thermostat 89 is closed or maintaining the closing state since the temperature T3 of the coolant water supplied to the internal combustion engine 100 is less than or equal to the predetermined value T4. Therefore, the coolant water circulating through the internal combustion engine 100 is only the coolant water inside the starting circulating route 81.

The microbubbles M are generated by activating the microbubble generator 4, and the generated microbubbles M are mixed into the coolant water, which is the medium. Therefore, the coolant water in which the microbubbles M are mixed can decrease the viscosity, the heat conductivity, and the heat capacity compared to the coolant water in which the microbubbles M are not mixed.

The amount of the coolant water circulating through the internal combustion engine 100 when the thermostat 89 is closed is less than the amount of the coolant water when the thermostat 89 is opened due to the amount of the coolant water inside the driving circulating route 82 and inside the radiator 88. Therefore, more coolant water circulating through the internal combustion engine 100 flows through the microbubble generator 4 when the temperature T3 of the coolant water is low, whereby the amount of the microbubbles M mixed into the coolant water is increased in a short time. Consequently, the viscosity, the heat conductivity, and the heat capacity, of the coolant water can be decreased in the short time.

Next, the ultrasonic wave generation controller 77 of the processor 72 activates the ultrasonic wave generator 5 while the microbubble generator 4 is activated (step ST204). The ultrasonic wave generator 5 generates the ultrasonic wave E, and the ultrasonic wave generator 5 irradiates the coolant water in which the microbubbles M are mixed with the ultrasonic wave E (see FIG. 3A). The temperature T3 of the coolant water in which the microbubbles M are mixed is uniformly and instantaneously raised since the microbubbles M, that are to be irradiated with the ultrasonic wave E and distributed uniformly within the coolant water, become the small microbubbles M' by the contraction or the break thereof.

The coolant water in which the temperature T3 is instantaneously raised is supplied into the internal combustion engine 100 with the microbubbles M that are mixed into the coolant water. The coolant water supplied into the internal combustion engine 100 is supplied to the section to be cooled of the heated part of the internal combustion engine 100 through a path not shown. The heat conductivity and the heat capacity of the supplied coolant water are decreased.

Therefore, warm up ability of the internal combustion engine 100 can be improved since it becomes difficult to receive the heat generated by the internal combustion engine 100 through which the coolant water circulates even if the temperature of the internal combustion engine 100 and the temperature of the coolant water are low so that it becomes easier to increase the temperature of the internal combustion engine 100. Therefore, fuel consumption can be improved and degradation of emission can be suppressed since warm up ability of the internal combustion engine 100 can be improved as described above.

Further, warm up ability of the internal combustion engine 100 can be further improved since the temperature T3 of the coolant water supplied into the internal combustion engine 100 is raised so that it is difficult to further receive the heat generated by the internal combustion engine 100 through which the coolant water flows.

Figure 8:
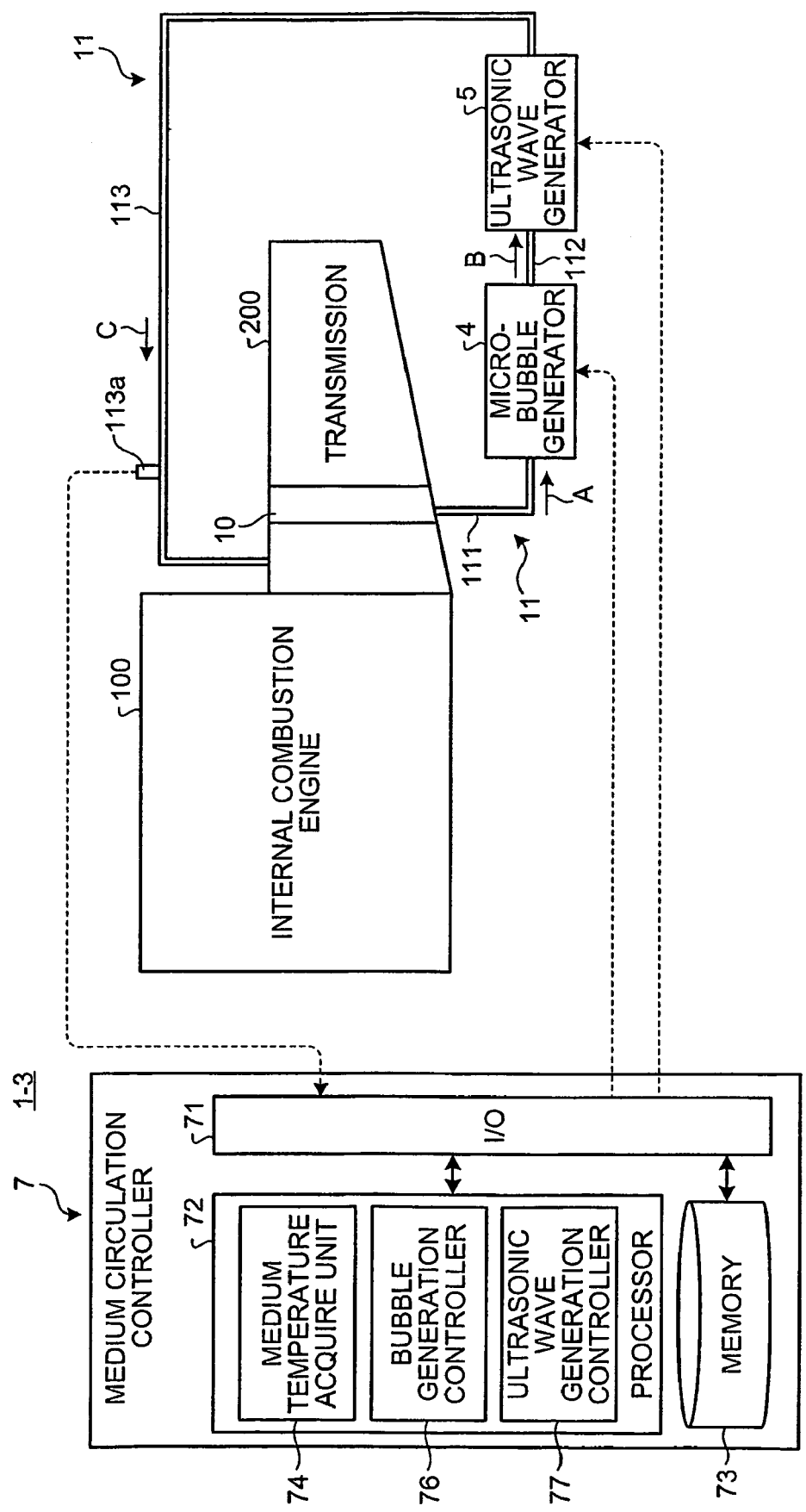
FIG. 8 is a schematic drawing of a medium circulating apparatus according to a third embodiment.

Next, a medium circulating apparatus 1-3 according to a third embodiment is explained. FIG. 8 is a schematic drawing of the medium circulating apparatus according to the third embodiment. The medium circulating apparatus 1-3 according to the third embodiment is connected to the internal combustion engine 100. Further, the medium circulating apparatus 1-3 uses transmission circulating oil (hereinbelow simply referred to as mission oil) as the medium, and the medium circulating apparatus 1-3 lubricates the driven part, drives the movable part, and cools the heated part when the transmission is activated by driving the internal combustion engine 100. The medium circulating apparatus 1-3 circulates the mission oil by a mission oil circulating route 11, which is the circulating oil circulation route passing through the transmission 200. Here, most of fundamental configurations of the medium circulating apparatus 1-3 according to the third embodiment are similar to the fundamental configurations of the medium circulating apparatus 1-1 according to the first embodiment; therefore, explanations for the identical parts (numbers in FIG. 8 that are the same as the numbers in FIG. 1) are not repeated.

The medium circulating apparatus 1-3 is configured by a mission oil pump 10, the microbubble generator 4, the ultrasonic wave generator 5, the mission oil circulating route 11, and the medium circulation controller 7. The mission oil circulating route 11 includes a space and a path formed inside the internal combustion engine 100 other than mission oil circulating paths 111 to 113 that connect the mission oil pump 10, the microbubble generator 4, the ultrasonic wave generator 5, and the like. Here, the mission oil flows through the paths. That is to say, the mission oil circulating route 11 includes the path used for supplying the mission oil to the section to be lubricated of the driven part, the section to be driven of the movable part, and the section to be cooled of the heated part, of the transmission 200. Here, 113a represents a mission oil temperature sensor that is the medium temperature detector for detecting the temperature of the mission oil supplied into the internal combustion engine 100, and for outputting the temperature to the medium circulation controller 7.

The mission oil pump 10 is arranged at a middle of the mission oil circulating route 11. The mission oil pump 10 pressurizes the mission oil passing through the transmission 200 to supply again into the transmission 200 through the microbubble generator 4 and the ultrasonic wave generator 5. The mission oil pump 10 is activated when the transmission 200 is activated. That is to say, the mission oil pump 10 is activated by the output generated by driving the internal combustion engine 100.

Figure 9:
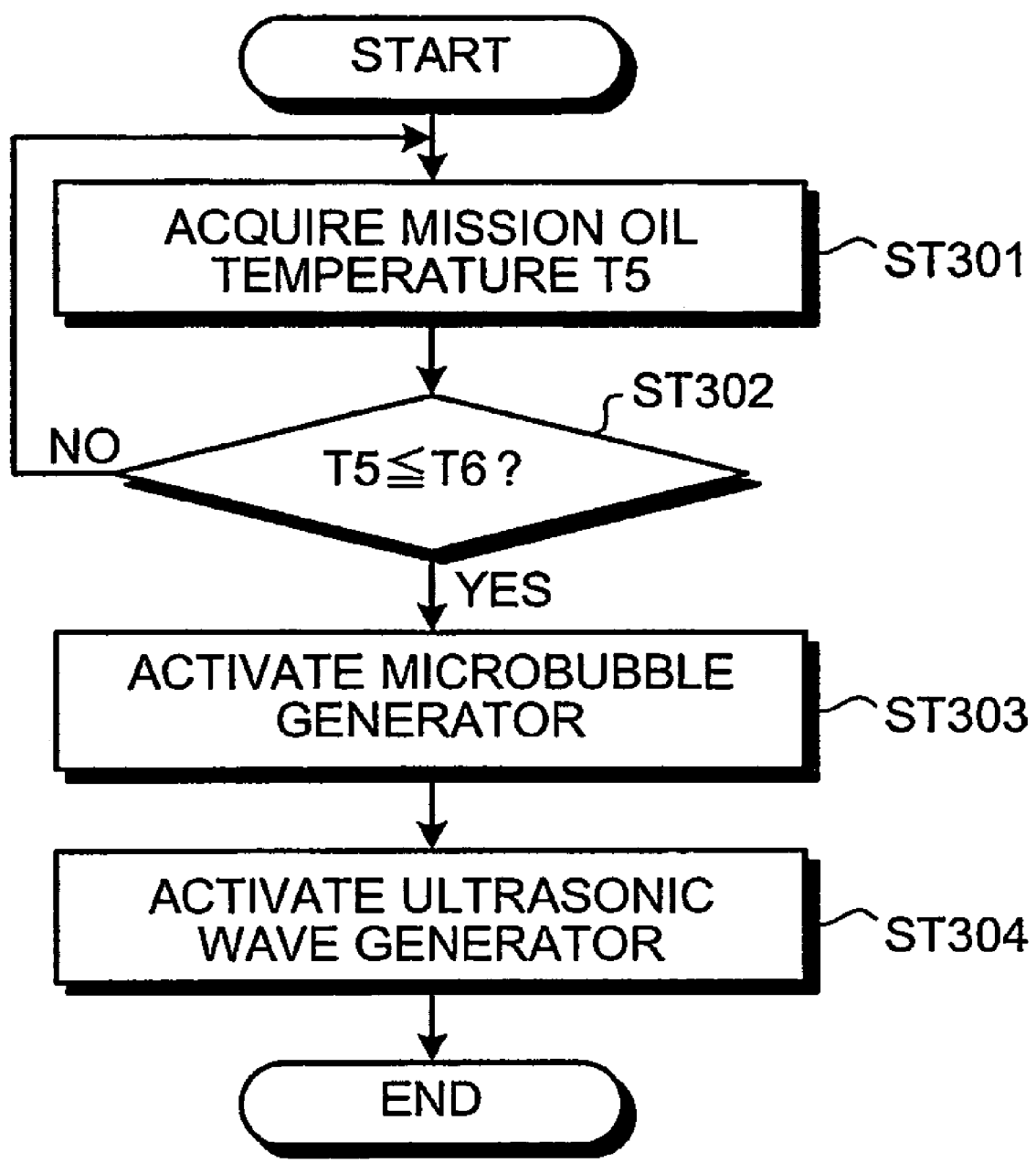
FIG. 9 is a control flow chart of the medium circulating apparatus according to the third embodiment.

Next, an operation of the medium circulating apparatus 1-3 according to the third embodiment is explained. FIG. 9 is a control flow chart of the medium circulating apparatus according to the third embodiment. Here, explanations for the operations of the medium circulating apparatus 1-3 according to the third embodiment that are identical to the operations of the medium circulating apparatus 1-1 according to the first embodiment are not repeated. The mission oil circulates constantly through the mission oil circulating route 11 from the start until the stop of the internal combustion engine 100 since the mission oil pump 10 is activated by activating the transmission 200 due to the driving of the internal combustion engine 100.

The medium temperature acquiring unit 74 of the processor 72 of the medium circulation controller 7 acquires a temperature T5 of the mission oil, which is the medium, while the mission oil circulates through the transmission 200 by activating the transmission 200 (step ST301). Specifically, the medium temperature acquiring unit 74 acquires the temperature T5 of the mission oil that circulates through the transmission 200. Here, the temperature T5 is detected by the mission oil temperature sensor 113a, and the temperature T5 is outputted to the medium circulation controller 7.

Next, the bubble generation controller 76 of the processor 72 determines whether the acquired temperature T5 of the mission oil is less than or equal to a predetermined value T6 or not (step ST302). Here, the temperature T6 is a temperature at which the viscosity of the mission oil circulating through the transmission 200 is high. That is to say, it becomes difficult to start the internal combustion engine 100 due to the friction at the transmission at the temperature. For example, such temperature is the temperature of the mission oil at the cold start of the internal combustion engine 100. The medium temperature acquiring unit 74 of the processor 72 repeats to acquire the temperature T5 of the mission oil until the acquired temperature T5 of the mission oil becomes less than or equal to the predetermined value T6.

Next, the bubble generation controller 76 of the processor 72 activates the microbubble generator 4 when the microbubble generation controller 76 determines that the temperature T5 of the mission oil supplied to the transmission 200 is less than or equal to the predetermined value T6 (step ST303). The microbubbles M are generated since the microbubble generator 4 is activated, and the generated microbubbles M are mixed into the mission oil, which is the medium (see FIGS. 2A and 2B). Therefore, the mission oil in which the microbubbles M are mixed can decrease the viscosity, the heat conductivity, and the heat capacity, compared to the mission oil in which the microbubbles M are not mixed.

Next, the ultrasonic wave generation controller 77 of the processor 72 activates the ultrasonic wave generator 5 while the microbubble generator 4 is activated (step ST304). The ultrasonic wave generator 5 generates the ultrasonic wave E, and the ultrasonic wave generator 5 irradiates the mission oil in which the microbubbles M are mixed with the ultrasonic wave E (see FIG. 3A). The uniformly distributed microbubbles M within the mission oil that are irradiated with the ultrasonic wave E become the small microbubbles M' by the contraction as shown in FIG. 3B, as well as the microbubbles M break due to the ultrasonic wave E. Therefore, the temperature T5 of the mission oil in which the microbubbles M are mixed is uniformly and instantaneously raised.

The mission oil in which the temperature T5 is instantaneously raised is supplied into the transmission 200 with the microbubbles M that are mixed into the mission oil. The mission oil supplied into the transmission 200 is supplied to the section to be lubricated of the driven part, the section to be driven of the movable part, and the section to be cooled of the heated part, of the transmission 200 through paths not shown. The heat conductivity and the heat capacity of the mission oil supplied thereto are decreased.

Therefore, the friction caused when the driven part of the transmission 200 is lubricated can be reduced by the mission oil even if the temperature of the transmission 200 is low and the temperature of the mission oil is low so that startability of the internal combustion engine 100 connected to the transmission 200 can be improved. Further, the medium can hardly receive the heat generated by the transmission 200 through which the mission oil is circulated even if the temperatures of the transmission 200 and the mission oil are low whereby the temperature of the transmission 200 can be raised easily. Therefore, warm up ability of the transmission 200 can be improved. Startability of the internal combustion engine 100 and warm up ability of the transmission 200 can be improved as explained above; therefore, fuel consumption can be improved and degradation of the emission can be suppressed.

In the first, the second, and the third embodiment above, the microbubble generator 4 can generate the microbubbles M by injecting the mixture of the medium and the gas after mixing the medium and the gas at the bubble generation main body 41. Then, the microbubbles M can be mixed into the medium.

Further, in the first, the second, and the third embodiment, it is preferred to start activating the microbubble generator 4 and the ultrasonic wave generator 5 immediately before starting the internal combustion engine 100. Consequently, the microbubbles M can be mixed into the medium when the medium starts to circulate through the internal combustion engine 100 or through the transmission 200 so that the medium in which the microbubbles are mixed can be irradiated with the ultrasonic wave E.

INDUSTRIAL APPLICABILITY

As described above, the medium circulating apparatus according to the present invention is useful for a medium circulating apparatus that circulates at least one of an engine oil, a coolant water, and a mission oil, through an internal combustion engine or through a transmission, and more particularly useful for improving startability and warm up ability of the internal combustion engine.

The invention claimed is:

1. A medium circulating apparatus for improving startability and warm up ability, comprising:
    a microbubble generator that generates microbubbles and mixes the microbubbles into the medium; and
    a medium temperature acquiring unit that acquires a temperature of the medium, wherein
    the microbubble generator generates the microbubbles when the temperature of the medium is less than or equal to a predetermined value.

2. The medium circulating apparatus according to claim 1, wherein
    the medium is an internal combustion engine circulating oil that circulates in a circulating oil circulating route passing through an internal combustion engine.

3. The medium circulating apparatus according to claim 2, further comprising:
    a circulating oil storage that includes a plurality of tanks storing the internal combustion engine circulating oil, and performs communicative connection between the tanks depending on a temperature of the internal combustion engine circulating oil, wherein
    the circulating oil storage does not perform the communicative connection between the tanks when the temperature of the internal combustion engine circulating oil is less than or equal to a predetermined value.

4. The medium circulating apparatus according to claim 1, wherein
    the medium is a coolant water that circulates through coolant water circulating route passing through an internal combustion engine.

5. The medium circulating apparatus according to claim 4, wherein
    the coolant water circulating route includes
    a starting circulating route that is provided with the microbubble generator at a middle thereof, and guides the coolant water into the internal combustion engine;
    a driving circulating route that includes a coolant unit cooling the coolant water, and is communicatively connected to the starting circulating route depending on a temperature of the coolant water, wherein
    the driving circulating route is not communicatively connected to the starting circulating route when the temperature of the coolant water is less than or equal to a predetermined value.

6. The medium circulating apparatus according to claim 1, wherein
    the medium is a transmission circulating oil that circulates through a circulating oil circulating route passing through a transmission.

7. The medium circulating apparatus according to claim 1, wherein
    the microbubble generator generates the microbubbles from a gas by a shear force caused by injection of the medium.

8. The medium circulating apparatus according to claim 1, further comprising:
    an ultrasonic wave generator that generates an ultrasonic wave depending on a gas in the microbubbles generated by the microbubble generator, and irradiates the medium containing the microbubbles with the ultrasonic wave, when the temperature of the medium is less than or equal to a predetermined value.

\* \* \* \* \*

UNITED STATES PATENT AND TRADEMARK OFFICE
CERTIFICATE OF CORRECTION

PATENT NO. : 8,047,165 B2
APPLICATION NO. : 11/922141
DATED : November 1, 2011
INVENTOR(S) : Yasushi Ito It is certified that error appears in the above-identified patent and that said Letters Patent is hereby corrected as shown below:

On the Title Page: Replace "(86) PCT No.: PCT/JP2006/011664" with

--(86) PCT No.: PCT/JP2006/311664--.

Signed and Sealed this
Thirty-first Day of January, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,047,165 B2 | |
| APPLICATION NO. | : 11/922141 | |
| DATED | : November 1, 2011 | |
| INVENTOR(S) | : Yasushi Ito | |

It is certified that error appears in the above-identified patent and that said Letters Patent is hereby corrected as shown below:

| Column | Line | |
|---|---|---|
| 18 | 3 | After "through" insert --a--. |

Signed and Sealed this
Fourteenth Day of August, 2012

David J. Kappos
*Director of the United States Patent and Trademark Office*